2,870,149

MORPHOLINE ETHERS IV

Howard B. Wright and Marjorie B. Moore, Waukegan, Ill., assignors to Abbott Laboratories, North Chicago, Ill., a corporation of Illinois No Drawing. Application November 29, 1954
Serial No. 471,904

4 Claims. (Cl. 260—247.7)

The present invention relates to morpholine ethers and more particularly to lower alkoxy phenyl ethers of morpholinoalkanols.

In general, the compounds of the present invention are prepared by forming an alkali or alkaline earth metal salt of a hydroxy aryl compound, and reacting the resultant salt of the hydroxy compound with a morpholino alkyl halide to produce the corresponding aryl ether of the morpholinoalkanol.

The invention is illustrated by the following specific examples:

EXAMPLE I

γ-Morpholinopropyl 4-cyclohexylphenyl ether

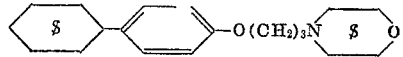

Potassium hydroxide (5.6 g.), p-cyclohexylphenol (17.6 g.), and γ-morpholinopropyl chloride (16.3 g.) are refluxed in 150 cc. of ethanol for about 24 hours. On standing a solid precipitates which is recrystallized from ethanol to give the white crystalline solid γ-morpholinopropyl 4-cyclohexylphenyl ether which when thoroughly dried has a melting point of 90° C. On chemical analysis the base is found to contain 4.67% N as compared with a theoretical analysis of 4.63% N.

The hydrochloride salt of the said base is prepared by dissolving the base in ethanol and acidifying with hydrochloric acid to give the crystalline solid hydrochloride having a melting point of 215–216° C.

The compounds of the invention may also be prepared by refluxing in a dry solvent an ω-haloalkyl aryl ether with morpholine. The hydrohalide salt is then separated by suitable means and the desired ether recovered.

The ω-haloalkyl aryl ethers for the starting materials may be obtained by the usual methods, as by the reaction of the sodium salt of the aryl hydroxide with an alkyl dihalide. Similarly, the sodium salt of the aryl hydroxide may be reacted with a halohydrin, and the resulting ω-hydroxyalkyl aryl ether is further reacted with a phosphorus or thionyl halide or a halogen acid to give the desired ω-haloalkyl aryl ether. The reaction of the ω-haloalkyl aryl ether with morpholine gives the desired alkamine ether.

Still another method of preparing the compounds of the present invention comprises reacting an alkali metal in a finely divided form, such as a dispersion of sodium in toluene, with the desired aryl phenol to form the alkali metal salt of the hydroxy aryl compound and treating the said alkali metal salt with a lower alkyl dihalide, such as 1-chloro-3-bromo-propane or 1,3-dibromo-propane, to form the halide of the aryl alkyl ester and reacting the said halide with morpholine to produce the desired morpholino ether. It should be understood that in place of the alkali metal one can use an alcoholate or alkali metal hydride to prepare the alkali metal salts of the desired hydroxy aryl compound.

The salts are generally prepared by dissolving the products (which are bases) in a solvent and adding an acid, which precipitates the salt. For example, by dissolving γ-morpholinopropyl 4-butylthiophenyl ether in dry ether and adding a solution of hydrochloric acid, sulfuric acid, citric acid, or picric acid, the hydrochloride, sulfate, citrate, or picrate salt, respectively, of the γ-morpholinopropyl 4-butylthiophenyl ether is formed. Similarly, the salts of the other named bases may be prepared.

While in the preceding specific examples of the morpholino ethers of the present invention R is shown as a bivalent hydrocarbon group having three carbon atoms, it should be understood that other bivalent lower hydrocarbons can be used with equal facility. Thus, R can be any lower bivalent hydrocarbon group, including the bivalent ethyl, butyl, and amyl groups. And, to prepare the corresponding ethyl, butyl, or amyl congeners of the ethers of the preceding examples, one uses in place of the γ-morpholinopropyl halide of Example I the following compounds: β-morpholinoyl chloride, δ-morpholinobutyl chloride, and ε-morpholinoamyl chloride, respectively, to produce the compounds β-morpholinoethyl ether, δ-morpholinobutyl ether, and ε-morpholinoamyl ether, respectively.

It should be understood that the Ar group of the compounds of the present invention may be either substituted or unsubstituted with the substituents being preferably not more than three and being either mixed or identical substituents. The substituent groups may be alkyl, alkenyl, nitro, phenyl, hydroxy, alkoxy, morpholinoalkoxy, aralkoxy, and aryloxy.

Compounds of the invention are useful as intermediates for certain organic compounds and further have utility as local anesthetics, either for surface anesthesia or in wheals for regional anesthesia. Generally, the compounds are used therapeutically in the form of inorganic or organic salts, for example, the hydrochloride, sulfate, citrate, picrate, and the like.

In the present application the term "lower alkylene" is used to designate a bivalent lower hydrocarbon radical other than an alkylidene group or the like in which both valences are taken from the same carbon atom.

This application is a continuation-in-part of applicants' now abandoned co-pending application Serial No. 187,666, filed September 29, 1950.

Others may readily adapt the invention for use under various conditions of service, by employing one or more of the novel features disclosed or equivalents thereof. As at present advised with respect to the apparent scope of our invention, we desire to claim the following subject matter.

We claim:

1. The ω-N-morpholino-lower alkylene cyclohexylphenyl ether wherein the said alkylene group has at least 2 carbon atoms in the carbon chain.

2. The acid addition salt of an ω-N-morpholino-lower alkylene cyclohexylphenyl ether wherein the said alkylene group has at least 2 carbon atoms in the carbon chain.

3. The compound γ-N-morpholinopropyl 4-cyclohexylphenyl ether.

4. The process which comprises refluxing potassium hydroxide in a lower aliphatic alcohol solvent with p-cyclohexylphenol, and adding γ-N-morpholinopropyl chloride to the refluxing mixture to produce γ-N-morpholinopropyl 4-cyclohexylphenyl ether.

References Cited in the file of this patent

UNITED STATES PATENTS

| | | |
|---|---|---|
| 2,484,621 | Hardman | Oct. 11, 1949 |
| 2,679,501 | Wenner | May 25, 1954 |

FOREIGN PATENTS

| | | |
|---|---|---|
| 130,555 | Australia | Nov. 28, 1946 |

OTHER REFERENCES

Idson: Chemical Reviews, vol. 47, number 3, pages 419–420, Sept. 12, 1950.